United States Patent [19]
Fairchild

[11] 3,814,108
[45] June 4, 1974

[54] TOBACCO SUBSTITUTE

[76] Inventor: Willis A. Fairchild, 273 W. Broadway, Shelbyville, Ind. 46176

[22] Filed: Jan. 3, 1972

[21] Appl. No.: 215,072

[52] U.S. Cl. .................................. 131/2, 131/17 R
[51] Int. Cl. ............................................ A24b 15/00
[58] Field of Search ................................. 131/17, 2

[56] References Cited
UNITED STATES PATENTS
2,576,021  11/1951  Koree .................................... 131/2
3,034,931  5/1962  Kiefer .................................... 131/2

OTHER PUBLICATIONS
"The Merck Index", Seventh Edition, published by the Merck Co., Rahway, N.J. 1960, – pages 880 and 1,010 cited.

"The Sinister Garden" – Booklet published by Wyeth Laboratories, Division of American Home Products Corp., N.Y. 1966, pages 2 & 3 cited.

The Chemistry and Technology of Tobacco (Text) Vol. 3–published by Pishchepromizdat, Moscow 1953 – Translation by the National Science Foundation, Wash. D.C. 1961 – Available – Office of Technical Services, U.S. Dept. of Commerce, Washington D.C., PST Cat. No. 96, pages 588, 589, 590, 602 and 603 cited.

*Primary Examiner*—Melvin D. Rein
*Attorney, Agent, or Firm*—Trask, Jenkins & Hanley

[57] ABSTRACT

A composition for smoking or chewing which contains little or no nicotine or tars and which is substantially comprised of plants from the genus Gnaphalium.

1 Claim, No Drawings

TOBACCO SUBSTITUTE

BACKGROUND OF THE INVENTION

The relatively large amounts of nicotine and tars in tabacco have been found to have a severely detrimental physiological effect upon the user thereof. When tabacco is smoked, the substantial amount of nicotine which is volatilized and contained in the tabacco smoke is rapidly absorbed through the mucous membranes of the upper respiratory tract of the user. Also, when tobacco is smoked or chewed, nicotine is carried by saliva to the stomach of the user where it then is absorbed.

The effect of nicotine which thereby passes into the human circulatory system constricts the blood vessels and is often responsible for an accompanying heart rate acceleration. The amount of nicotine which passes into the stomach of the user significantly increases the gastric acidity to a level which is particularly harmful to one suffering from stomach disorders such as peptic ulcers.

Efforts to reduce these harmful effects resulting from tobacco use have resulted in methods for reducing the amount of smoke reaching the absorption areas of the user, or even for treating tobacco with substances which physiologically counteract or negate the effect of the nicotine.

These efforts, as a whole, have been primarily unsuccessful. The elimination of the nicotine contained in the tobacco has generally resulted in tobacco which is unacceptable for smoking due to its taste or burning qualities. Filters and other devices which have been used to inhibit the flow of smoke to the user either drastically alter the taste of the smoke or are not very effective. The counteraction of the physiological effect of the nicotine, such as by adding an amount of the vitamin niacin, results in merely offsetting the capillary constriction caused by the nicotine with capillary dilation caused by the niacin. The niacin, however, may result in unwanted side effects.

The object of the present invention is to provide a smoking composition containing only traces of nicotine and tars and which has a natural aroma and flavor comparable to tobacco when smoked.

SUMMARY OF THE INVENTION

In accordance with one form of the invention, Gnaphalium polycephalum plants are harvested after they have dried in the field. The harvested plants are toasted and comminuted into the desired particle size and used as a tobacco substitute.

DETAILED DESCRIPTION OF THE PREFERRED EMBODIMENT

My invention provides a smoking composition which is principally comprised of plants from the genus Gnaphalium. Gnaphalium plants are found in the midwestern and southern areas of the United States. Some of the species of the Gnaphalium genus which can be used are polycephalum, macounii and obtusifolium, but for ease of description the invention is described in detail herein with respect to only the polycephalum species.

Polycephalum, or sweet cudweed as it is more commonly known, has been found to be the most desirable of the above species for use in the present invention. It has been discovered to have a natural aroma and flavor which is very pleasing, and, when smoked, the aroma and flavor are comparable to that of tobacco when similarly smoked.

The plant is an annual, and grows as a sparingly branched fragrant herb which normally attains a height of one to two and a half feet. The surface of the stems has a woolly characteristic, as does the underside of the leaves which grow to be from 1 to 3 inches long and are green on top. The flowers of the plant, which are shiny white and sometimes brown tinted, grow in clusters at the tips of the branches. The plant is found in dry, open woods and is known to contain oil which has been used as a tonic.

Gnaphalium polycephalum is grown by preparing a seed bed and sowing the seed in the same manner in which a plant such as oats is planted. Preferably, the plants are sown in the spring and allowed to mature and cure while in the field. About 180 days has been found to be sufficient for the requisite maturing and curing to take place. The plants are harvested by conventional methods, such as by the use of a hay making machine, and then baled in preferably 50 pound bales for ease of storing.

In the preparation of a smoking product in accordance with the invention, the bales are opened and the contents processed as tobacco would be normally processed. The material may be first dried and toasted as by conveying it on a moving belt in communication with suitably controlled heating elements. The material is comminuted into the desired particle size as by crushing and shredding either before or after the drying operation.

Desirably, the dried and shredded *Gnaphalium polycephalum* material is then sprayed or mixed with a small amount of one or more non-toxic additives such as aromatics, humectants, coloring agents and the like, which are used to bind the shredded material together and enhance its color, aroma, flavor and burning qualities. Such additives may be the same as those which are used in the casing of tobacco. The particular additive and the quantity used is dependent upon the final use to which the *Gnaphalium polycephalum* is to be put, such as chewing or as smoking material in cigars or cigarettes. Normally, the non-toxic additives comprise no more than 15 percent of the weight of the final composition. The better known casing materials are maple, sugar, carmel, distilled water, glycerol, licorice root, vanillin, molasses, apple derivatives, clove, prune juice, sucrose, etc.

The above additives may be applied as by spraying or preparing a thick mixture of the additives and combining the shredded plant material therewith. The resultant composition is then formed into the desired end product.

Polycephalum, as well as the macounii and obtusifolium species, have been analytically tested and have been found to have only traces of the nicotine and the tars found in tobacco. While they may be used by themselves with the aforementioned additives to form a smoking composition, they may also be combined with conventional tobacco compositions to add their own flavors to that of tobacco, and substantially reduce the amount of nicotine which a user would acquire from a composition comprised of only tobacco.

What I claim as my invention is:

1. An improved smoking product consisting essentially of a plant material of the group consisting of *Gnaphalium polycephalum*, *Gnaphalium macounii* and *Gnaphalium obtusifolium*, said plant material being dried and toasted and admixed with a small amount of up to 15 percent of a non-toxic combustible casing material.

* * * * *